(12) United States Patent
Hyun et al.

(10) Patent No.: US 9,547,843 B2
(45) Date of Patent: Jan. 17, 2017

(54) METHOD AND APPARATUS FOR LOCATING A MOBILE TERMINAL USING RECEIVED MESSAGES

(75) Inventors: Dong-Joon Hyun, Seoul (KR);
Sung-Ho Ryu, Suwon-si (KR);
Seok-Hyun Yoon, Seongnam-si (KR);
Hee-Seon Park, Seoul (KR);
Min-Hyok Bang, Seoul (KR);
Dong-Hun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1470 days.

(21) Appl. No.: 12/917,266

(22) Filed: Nov. 1, 2010

(65) Prior Publication Data

US 2011/0171968 A1 Jul. 14, 2011

(30) Foreign Application Priority Data

Jan. 13, 2010 (KR) ........................ 10-2010-0003256

(51) Int. Cl.
*H04W 24/00* (2009.01)
*G06Q 10/10* (2012.01)
(Continued)

(52) U.S. Cl.
CPC ............. *G06Q 10/107* (2013.01); *H04W 4/12* (2013.01); *G06Q 30/0255* (2013.01);
(Continued)

(58) Field of Classification Search
CPC ...... H04W 64/00; H04W 4/02; H04W 64/003; H04W 12/12; H04W 4/12; H04W 4/18; H04W 4/20; H04W 4/025; H04W 4/028; H04W 76/007; H04W 4/023; H04L 67/18; G06Q 20/3224; G06Q 20/18; G06Q 20/40; G06Q 20/32; G06Q 20/401; G06Q 20/4016; G06Q 30/0271; G06Q 40/02; G06Q 30/0261; G06Q 20/3223; G06Q 30/0269; G06Q 20/3221; G06Q 20/3255; G06Q 20/341; G06Q 30/00; G06Q 30/04; G07F 19/20; G07F 19/207; G07G 3/003; G01S 5/0027
(Continued)

(56) References Cited

U.S. PATENT DOCUMENTS 8,204,676 B2 6/2012 Tanabe
9,083,745 B2 7/2015 Edge
(Continued)

FOREIGN PATENT DOCUMENTS

JP 2008-084016 4/2008
KR 10-2005-0110492 11/2005
(Continued)

OTHER PUBLICATIONS

Korean Office Action issued on Dec. 8, 2015 in counterpart Korean Application No. 10-2010-0003256 (9 pages in Korean with English translation).

*Primary Examiner* — Olumide T Ajibade Akonai
(74) *Attorney, Agent, or Firm* — NSIP Law

(57) ABSTRACT

A method and apparatus for locating a mobile terminal by use of messages received to the mobile terminal are provided. The mobile terminal locating method may include creating at least one location related candidate for the mobile terminal by use of a message that is received to the mobile terminal, and determining a location of the mobile terminal by matching the created location related candidate to stored place information. The current location of the mobile terminal may be recognized by simply analyzing the received messages without the need for installation of additional device on the mobile terminal.

20 Claims, 10 Drawing Sheets

(51) Int. Cl.
  *H04W 4/12* (2009.01)
  *G06Q 30/02* (2012.01)
  *H04W 4/02* (2009.01)
  *H04W 64/00* (2009.01)
  *H04W 4/18* (2009.01)

(52) U.S. Cl.
  CPC ..... *G06Q 30/0261* (2013.01); *G06Q 30/0267* (2013.01); *H04W 4/025* (2013.01); *H04W 4/185* (2013.01); *H04W 64/003* (2013.01)

(58) Field of Classification Search
  USPC ............ 455/456.1, 456.5, 456.6, 466, 456.3
  See application file for complete search history.

(56) References Cited

U.S. PATENT DOCUMENTS

| | | | | |
|---|---|---|---|---|
| 2004/0235450 | A1* | 11/2004 | Rosenberg | 455/406 |
| 2005/0020287 | A1* | 1/2005 | Pohutsky et al. | 455/466 |
| 2005/0277427 | A1* | 12/2005 | Zhang | 455/456.1 |
| 2008/0070546 | A1* | 3/2008 | Lee | G08B 25/016 455/404.2 |
| 2009/0075677 | A1* | 3/2009 | Seger | G08B 21/0261 455/456.6 |
| 2010/0145607 | A1* | 6/2010 | Chen et al. | 701/201 |
| 2010/0151881 | A1* | 6/2010 | Jang et al. | 455/456.1 |
| 2010/0279656 | A1* | 11/2010 | Hazzani | 455/411 |
| 2011/0047182 | A1* | 2/2011 | Shepherd et al. | 707/780 |
| 2011/159845 | A1* | 6/2011 | Sanjeev | 455/411 |

FOREIGN PATENT DOCUMENTS

| | | |
|---|---|---|
| KR | 10-2006-0073101 | 6/2006 |
| KR | 10-2006-0125333 | 12/2006 |
| KR | 10-2007-0099750 | 10/2007 |
| KR | 10-2008-0010077 | 1/2008 |
| KR | 10-2008-0016706 | 2/2008 |
| KR | 10-2008-0036176 | 4/2008 |
| KR | 10-2008-0038722 | 5/2008 |
| KR | 10-2009-0001855 A | 1/2009 |
| KR | 10-2009-0021956 | 3/2009 |
| KR | 10-2009-0025147 A | 3/2009 |
| KR | 10-2009-0042048 | 4/2009 |
| KR | 10-2009-0126297 A | 12/2009 |

* cited by examiner

FIG. 2A

| SAMSUNG CARD<br>01/16 10:11<br>CGV JOOCK JEON<br>8,000WON<br>SINGLE PAYMENT<br>THANK YOU | SAMSUNG CARD<br>12/17 19:58<br>JEIL GAS STATION<br>IN GWON SEON<br>40,000WON<br>BONUS CLUB<br>THANK YOU | SAMSUNG CARD<br>11/08 12:13<br>BONJOOK<br>IN GWONSEON BRANCH (G<br>18,000WON<br>SINGLE PAYMENT<br>THANK YOU |
|---|---|---|
| HANA BC(3*1*)<br>HONG, GIL-DONG.329,000<br>WON.SINGLE PAYMENT.<br>APPROVAL.<br>02/21.FORTYONE PAST<br>FIFTEEN.<br>YAMAHA MUSIC IN SUWON | HANA BC(3*1*)<br>HONG, GIL-DONG.80,000<br>WON.SINGLE PAYMENT.<br>APPROVAL.<br>01/17.TWENTY PAST SIX.<br>GINSENG STEAMED RED<br>BY JUNG GWAN JANG-<br>MAETAN BRANCH | CITY CARD<br>HONG, GIL-DONG<br>STATEMENT OF APPROVAL<br>AUGUST 30 11:18<br>18,000WON<br>HIGH MART IN SOUTH<br>SUWON<br>247,000WON<br>SINGLE PAYMENT |

FIG. 2B

| | |
|---|---|
| OUTBACK GWONSEON BRANCH<br>SETTLEMENT PRICE:<br>61710 WON<br>CGV JOOCK JEON<br>(01/09 18:53)DISCOUNT 9256,<br>REMAINDER 20744 | [BC]LOTTE WORLD<br>147TOP POINTS<br>ARRIVAL OF TOP CANDIES<br>[PARTICIPATION IN<br>TOP.BCCARD.COM] |
| TOURS LES JOURS<br>GWONSEON BRANCH<br>5000WON<br>(01/20 13:21)<br>DISCOUNT 1000,<br>REMAINDER 19744 | LOTTE WORLD<br>SETTING PRICE 35000 WON<br>(08/14 10:45)<br>APPROVAL.<br>DISCOUNT 14000,<br>REMAINDER 3289 |

FIG. 3A

| SAMSUNG CARD 08/14 10:31 LOTTE WORLD ADVENTURE CO,. LTD. 21,000WON SINGLE PAYMENT THANK YOU | LOTTE WORLD 35000WON (08/14 10:30) DISCOUNT 14000, REMAINDER 3289 | [SIGNLE PAYMENT APPROVAL] 21,000WON HANABC(3*1*) HONG, GIL-DONG 08/14 10:47 LOTTE WORLD ADVENTURE CO,. LTD. |

FIG. 3B

CITY CARD
HONG, GIL-DONG
SETTLEMENT APPROVAL
SEPTEMBER 06 10:51 SHINS
EGAE EMART CO., LTD. IN GU
100,000 SINGLE PAYMENT

[APPROVAL OF SINGLE PAYMENT]
27,890WON
HANABC(3*1*)HONG, GIL-DONG
09/08 20:17
LOTTE SHOPPING LOTTE MART CO., LTD. IN HWA

SAMSUNG CARD
08/11 18:00
5.0%BONUS CLUB
BUGOGGI BROTHERS IN SU
36,600WON

SAMSUNG CARD
09/09 20:16
SK NETWORKS EN
181,000WON
SINGLE PAYMENT
THANK YOU

SAMSUNG CARD
08/23 15:36
COSTCO KOREA CO., LTD.
203,000WON
SINGLE PAYMENT
THANK YOU

FIG. 3C

```
CITY CARD
HONG, GIL-DONG
SETTLEMENT APPROVAL
AUGUST 24 23:57 INTERPARK
CO., LTD. (ORDINARY)
SINGLE PAYMENT OF 14,250
```

```
CITY CARD
HONG, GIL-DONG APPROVAL
AUGUST 18 15:38
LIBRO EULGI BOOK STORE
CO., LTD.
SINGLE PAYMENT OF 15800
```

```
SAMSUNG CARD
09/06 13:24
STARBUCKS COFFE CO., LTD.
8,800WON
SINGLE PAYMENT
THANK YOU
```

```
[APPROVAL OF SINGLE
PAYMENT]
1,000,000WON
HANABC(3*1*)HONG, GIL-
DONG
08/25 13:42
WIZ ISLAND CO., LTD.
```

```
SAMSUNG CARD
08/21 20:32
BONUS CLUB
GS RETAIL CO., LTD.
73,500WON
THREE MONTHLY
INSTALLMENTS
```

FIG. 3E

| | |
|---|---|
| HANA BC(3*1*)<br>HONG, GIL-DONG. 80,000<br>WON. SINGLE PAYMENT<br>APPROVAL<br>01/17. SIX PAST<br>SINGLE PAYMENT TWENTY | [APPROVAL OF SINGLE<br>PAYMENT]<br>27,890WON<br>HANA BC(3*1*)HONG, GIL-<br>DONG<br>09/08 20:17<br>LOTTE SHOPPING LOTTE<br>MART CO,. LTD. IN HWA |

METHOD AND APPARATUS FOR LOCATING A MOBILE TERMINAL USING RECEIVED MESSAGES

CROSS REFERENCE TO RELATED APPLICATION(S)

This application claims the benefit under 35 U.S.C. §119(a) of Korean Patent Application No. 10-2010-0003256, filed on Jan. 13, 2010, the entire disclosure of which is incorporated herein by reference for all purposes.

BACKGROUND

1. Field

The following description relates to a technology of locating, and more particularly, to a method and apparatus for locating a mobile terminal by use of a message received from the mobile terminal.

2. Description of the Related Art

The current location of a user possessing a mobile terminal may be recognized using various techniques.

In a first example, the current location of a user may be recognized through a Global Positioning System (GPS) receiver that is installed on the mobile terminal and which receives location information from a GPS satellite. In this example, however, the mobile terminal further needs to have the GPS receiver, creating an additional cost for installation, leading to implementation complexity, and exhibiting a position error to some degree. In addition, the accuracy of positioning is susceptible to weather, environmental factors (e.g., trees and buildings), and topology. Assisted GPS uses an operator-maintained ground station to correct for GPS errors caused by the atmosphere and/or topography. Assisted GPS positioning typically uses cell-based positioning methods when indoors or when buildings or trees block the GPS reception.

In a second example, the current location of a user may be recognized by use of location information of a base station to which the mobile terminal is connected. This is based on measuring power levels and antenna patterns and assumes that a mobile phone always communicates wirelessly with one of the closest base stations, so if it is known which base station the phone communicates with, it can be determined that the phone is close to that base station. The base station is a stationary entity, and the mobile terminal resides within the coverage of the base station. Accordingly, if a query is performed as to which base station the mobile terminal is connected, the schematic location of the mobile terminal can be estimated. This example does not use an additional apparatus for locating the mobile terminal, but exhibits great position error.

In a third example, the current location of a user may be recognized by use of location information of an access router to which the mobile terminal is connected through a wireless LAN interface. This example needs a wireless LAN access apparatus to be installed, and is available for use only when an access router exists nearby, and creates additional communication cost.

SUMMARY

In one general aspect, there is provided a method of locating a mobile terminal, the method including: creating at least one location related candidate for the mobile terminal by use of a message that is received by the mobile terminal, and determining a location of the mobile terminal by matching the created location related candidate to stored place information.

In the method, the determining of the location of the mobile terminal may be performed by further referring to reception time information at which the message is received to the mobile terminal.

The method may further include correcting information about the determined location, using the determined location of the mobile terminal, based on at least one of: location information of a base station in communication with the mobile terminal, reception information of a Global Positioning System (GPS), and information of a wireless internet access point.

In the method, the creating of the location related candidate may include extracting a location related word or a place related word from the received message.

In the method, the stored place information may include exact location information which corresponds to the extracted word, the location information being updated or added according to the determined location of the mobile terminal.

In the method, the message may include at least one of: a short message service (SMS) or a multimedia messaging service (MMS).

In the method, the message may include at least one of: a message regarding credit card processing, a message regarding membership card usage, and a message regarding point card usage.

In the method, the stored place information may include an abbreviation name or another name which is set by a user and to which exact location data is matched.

In the method, the determined location of the mobile terminal may include at least one of: azimuth information, including at least one of: longitude, latitude, and an altitude, and place information denoting a place name.

In the method, the determining of the location may be performed by extracting place information belonging to a group which is selected by a user from the stored place information, and matching the extracted place information to the location related candidate.

In the method, if location related information is incapable of being extracted from the message, the creating of the location related candidate may be performed by directly receiving a location related candidate from a user.

The method may further include guiding a path to a user-designated destination based on the determined location of the mobile terminal.

The method may further include providing another user with the determined location of the mobile terminal.

In another general aspect, there is provided an apparatus for locating a mobile terminal, the apparatus including: a location related candidate extracting unit configured to create at least one location related candidate for the mobile terminal by use of a message that is received to the mobile terminal, a place information storage unit configured to store place information about a place which is identified by an exact location, and a location determination unit configured to determine a location of the mobile terminal by matching the created location related candidate to the stored place information.

In the apparatus, the location determination unit may be further configured to determine the location of the mobile terminal by further referring to reception time information at which the message is received to the mobile terminal.

The apparatus may further include: a location information providing unit configured to provide the location of the mobile terminal based on at least one of: location information of a base station in communication with the mobile terminal, reception information of a Global Positioning System (GPS), and information of a wireless internet access point, and a location information correcting unit configured to correct information about the determined location of the mobile terminal that is provided from the location information providing unit, by use of the determined location of the mobile terminal.

In the apparatus, the place information storage unit may be further configured to update or add the stored place information by use of the determined location of the mobile terminal.

In the apparatus, the determined location of the mobile terminal may include at least one of: azimuth information including at least one of: longitude, latitude, and an altitude, and location information denoting a place name.

The apparatus may further include a path guiding unit configured to guide a path to a user-designated destination based on the determined location of the mobile terminal.

In another general aspect, there is provided a computer-readable information storage medium storing a program for causing a computer to implement a method of locating a mobile terminal, including: creating at least one location related candidate for the mobile terminal by use of a message that is received by the mobile terminal, and determining a location of the mobile terminal by matching the created location related candidate to stored place information.

Other features and aspects may be apparent from the following detailed description, the drawings, and the claims.

BRIEF DESCRIPTION OF THE DRAWINGS

FIGS. 2A and 2B are views illustrating actual messages, including current location information, which are received by the mobile terminal.

Figure 1:
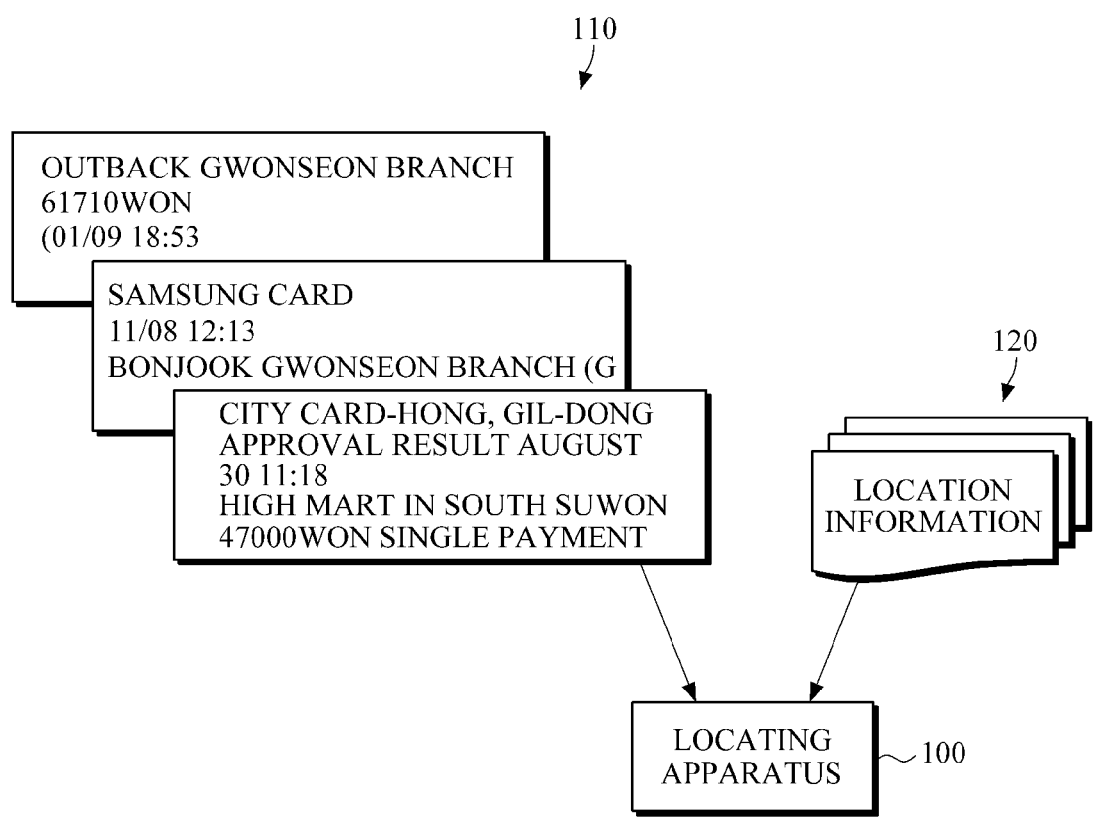
FIG. 1 is a conceptual view used to explain a method of locating a mobile terminal.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 is a conceptual view used to explain a method of locating a mobile terminal.

As shown in FIG. 1, an apparatus 100 for locating a mobile terminal may receive various types of messages 110. The messages may include a message based on a short message service (SMS), and a message based on a multimedia message service (MMS). A message may contain information concerning places, place names, store names, and time information. For example, a message may contain the settlement list of a credit card or information about point/membership card usage. For example, when a user pays with a credit card, the settlement list of the credit card may be transported to a mobile terminal of the user through a message. The message may contain various information such as a day when the charge is made, a charge time, a store name, a charged price, a point score, a charge approval result, and a specification of a monthly installation. This list is nonlimiting and non-exhaustive.

Accordingly, the location of a user of the mobile terminal may be recognized by analyzing the message 110. The locating apparatus 100 may be mounted on a mobile terminal such as a mobile phone, a PDA, a smart phone, etc. In addition, the locating apparatus 100 may enhance the accuracy in calculating the location by further receiving location information from the global positioning system (GPS) receiver and a wireless LAN access apparatus that may be mounted on the mobile terminal. A method of locating a mobile terminal using the GPS receiver and the wireless LAN access apparatus may cause a location error or may fail to output a location result. If location information obtained by using a message is applied to the above method, the accuracy in locating the mobile terminal is enhanced.

FIGS. 2A and 2B are views illustrating actual messages, including current location information, which are received by the mobile terminal.

The message 110 may be a message relating to credit card usage shown in FIG. 2A. The credit card usage related message may include a message regarding a statement approval, a message regarding a cancelling of a charge, etc. The credit card usage related message may contain various pieces of information, such as the date and time of use of the credit card, a store name, a place name, the price, an approval result, and a specification of a monthly installation in the form of a text. This list is nonlimiting and non-exhaustive. As shown in FIG. 2A, the credit card related message may be displayed in various forms, depending on credit card companies and stores. Alternatively, the credit card related message may be displayed in various forms depending on a system providing the message. Regardless of the displayed form of the message, the credit card usage related message may contain the name of a store or a place where the payment is charged with the credit card. Accordingly, the current location or the next location of a user possessing the mobile terminal may be determined by recognizing location information from the store name and the place name.

As shown in FIG. 2B, the message 110 may be a message relating to a membership card usage. The membership card related message may include messages relating to the collecting of points, the use of collected points, the cancellation of the use of points, etc. The membership card usage related message may also contain the name of a store or a place, such that the current location or the next location of a user possessing the mobile terminal may be recognized by use of the location information about the store.

FIGS. 3A and 3E are views illustrating various messages that are received to the mobile terminal.

The message 110 may be implemented in various forms. For example, even if a user pays using credit card in an amusement park named "Lotte world," the store name regarding the use of the credit card may be displayed in various forms such as those of "Hotel Lotte Co., Ltd", "Lotte World," and "Lotte World Adventure Co., Ltd," The implementation of the message may vary, for example, depending on the credit card company, the performance and functionality of the mobile phone, or user settings.

As shown in FIG. 3B, only a part of the message may be displayed due to limitations such as the size of message. For example, when the size of a text message is limited to 80 bytes, if the contents to be sent exceed the limitation, only a content concerning a place may be displayed on the received message.

As shown in FIG. 3C, it may be difficult to locate the mobile terminal with only the received message. For example, in an example of an online store, "Interpark" "Libro Eulji book store", it may be difficult to obtain location information about the online store. Also, with only a message including store names such as "Starbucks coffee" or "GS retails", it may be difficult to locate the specified branch among a large number of "Starbucks coffee" or "GS retail" branches.

Figure 3D:
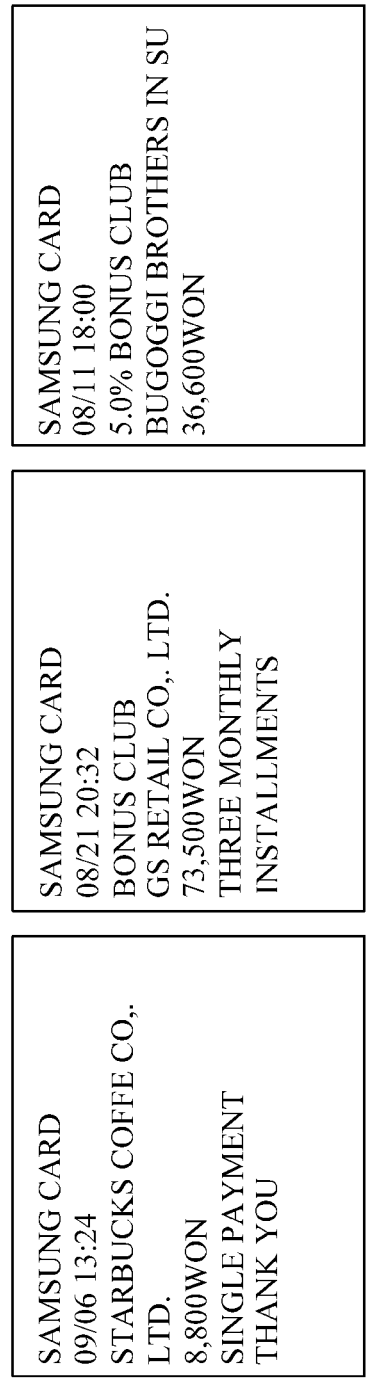
FIGS. 3A and 3E are views illustrating various messages that are received by the mobile terminal.

As shown in FIG. 3D, if a user pays using credit card in a store, the message relating to a credit card usage may be implemented in various forms, depending on the use of monthly installation, single payment, or the use of bonus points. In addition, as shown in FIG. 3E, even if the credit card is used in the same store, the details or form of the message may be periodically changed.

Accordingly, for example, location related information may be desired to be extracted from various kinds of messages. For example, the location related information may be extracted from each message by recognizing the position in the message where location related information appears. As another example, remaining words, except for irrelevant information, such as auxiliary words, price information, time information, or credit card company information may be extracted as the location related information. Further, the location related information may be extracted from various forms of messages through a generally known method, such as a syntax analysis using of text parsing.

Figure 4:
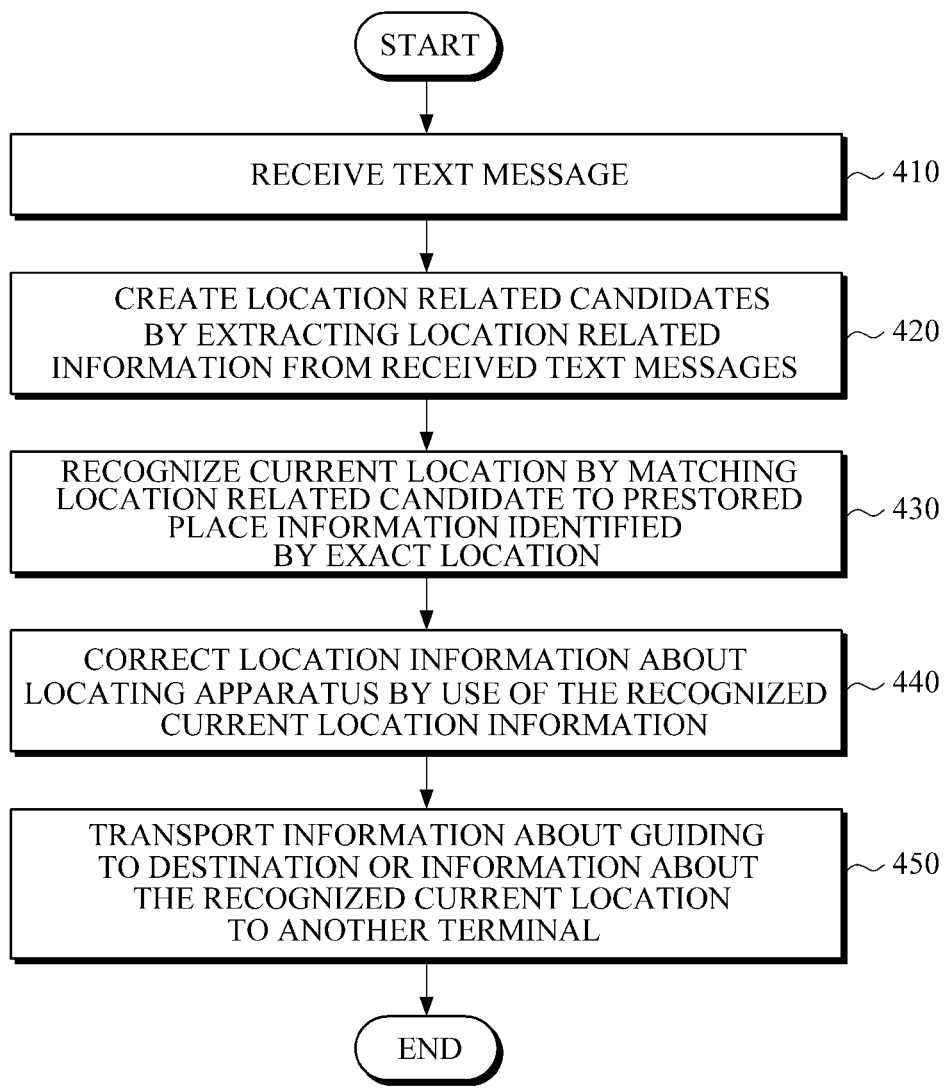
FIG. 4 is a flow chart illustrating a method of locating a mobile terminal.

FIG. 4 is a flow chart illustrating a method of locating a mobile terminal.

In operation 410, as a user possessing a mobile terminal uses a credit card, a membership card, etc., a message relating to the use of cards may be received to the user through the mobile terminal. The message may include a short message service (SMS) message and a multimedia messaging service (MMS) message. In operation 420, a location related candidate may be created from the received message. The location related candidate may be created by extracting a location related word or a place related word from the various forms of messages shown in FIGS. 3A to 3E. The location related candidate may represent the name of a store or a place where a credit card is used. If one or more messages are received, a plurality of location related candidates may be created. However, even if a single message is received, a plurality of location related candidates may be created.

In operation 430, the current location of a mobile terminal may be recognized by matching the created location related candidate with pre-stored information about a place which may be identified by an exact location. For instance, information about a place which is identified by an exact location may be stored as reference information in advance, and the location related candidate may be matched to the stored information. For example, addresses or azimuth information about a large number of stores and store names may be stored, and if a location related candidate matching a predetermined store or store name is found, the current location of a user may be recognized by corresponding the location related candidate to the address or azimuth information of the corresponding reference information.

In one example, the location of the mobile terminal may be determined by further referring to reception time at which each message is received. As an example, a user may pay with a credit card in a store "A" at 10 o'clock, and may receive a message regarding the use of the credit card. After that, the user may pay with the credit card in a store "B" at 12 o'clock, and may receive a message regarding the use of the credit card. If store "B" has branches in the areas of Suwon, Busan, and Jeju, it may be regarded that the user paid with the credit card in Busan, taking into consideration of the travel time between the respective areas Suwan, Busan, and Jeju, such that the location of the store "B" in Busan may be recognized as the current location of the user.

In addition, the place information used to match to the location related candidate may be updated or added by use of the location information that is determined as described above. The place name of the place information may be matched to a location (e.g., address and azimuth) of the place information in a one-to-one correspondence. Accordingly, if the place information is identical to a location related candidate included in the message, the location of a user may be precisely recognized based on the location information. The place information identified by an exact location may include an abbreviation name or another name which may be set by a user. The location corresponding to abbreviation name or another name may include location data that may be specified by a user. For example, a place name of "My Home" set by a user may be stored to correspond to location data. Meanwhile, the recognized location information may be azimuth information including the longitude, the latitude, the altitude or place information, and address information corresponding to a place name.

In matching the location related candidate to the pre-stored place information identified by exact location, the location related candidate may be matched only to place information belonging to a predetermined group that may be selected by a user, reducing the time required for the matching. For example, if a residential area of a user is confined to Seoul or Busan, only information about the corresponding places may be searched in the matching process, reducing the time required for searching and enhancing the efficiency of searching. In addition, if location related information is not capable of being extracted from a message, the mobile terminal may create the location related candidate in a manner to directly receive the location related candidate from a user. For example, if the message does not contain location information and it is impossible to create a location related candidate, the user may create the location related candidate by predicting the location of the mobile terminal based on observation of contents of the message.

In operation 440, by use of the above determined location, location information of the mobile terminal, which may be determined based on location information of a base station in communication with the mobile terminal, reception information of a Global Positioning System (GPS), or information of a wireless internet access point, may be corrected. That is, by using actually measured location information 120 together with location information included in the message 110, the locating accuracy may be enhanced.

According to another example, in operation 450, the finally determined location information may be used to guide a path to a destination that is specified by a user, or may be transferred to another mobile terminal.

Figure 5:
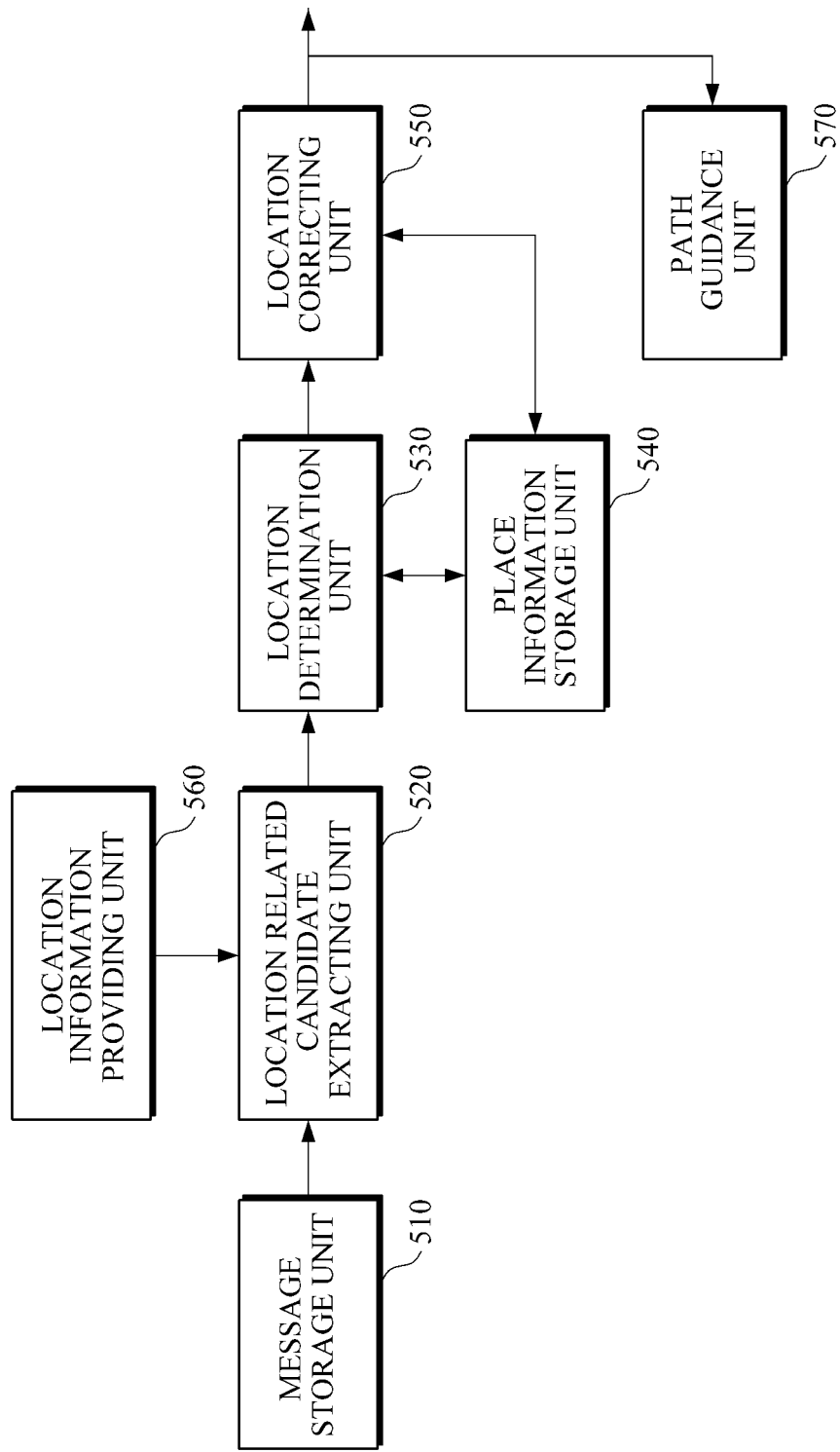
FIG. 5 is a block diagram illustrating an apparatus for locating a mobile terminal.

FIG. 5 is a block diagram illustrating an apparatus for locating a mobile terminal.

The mobile terminal locating apparatus 500 may include a message storage unit 510, a location related candidate extracting unit 520, a location determination unit 530, and a place information storage unit 540. According to another example, the mobile terminal locating apparatus 510 may further include a location correcting unit 550, location information providing unit 560, and a path guidance unit 570.

The message storage unit 510 may store a message received to a mobile terminal. The forms and details of the received messages are identical to those described above with reference to the examples of FIGS. 2A to 3E. The location related candidate extracting unit 520 may create at least one location related candidate from the stored messages. The creating of the location related candidate may be performed by extracting a location related word or a place related word from various forms of messages shown in the example of FIGS. 3A to 3E. The location related candidate may represent a store name where a card is used. If one or more messages are received, a plurality of location related candidates may be created.

The place information storage unit 540 may store information about a place which may be identified by exact location. The place information stored in the place information storage unit 540 may be updated or added by use of the determined location information.

The location determination unit 530 may determine the location of the mobile terminal by matching the location related candidate to the place information stored in the place information storage unit 540. The determined location information may include azimuth information, including the longitude, the latitude, and the altitude, or place information corresponding to a place name.

Meanwhile, the location correcting unit 550 may correct the determined location information, which may be determined by the location determination unit 530, by further referring to reception time at which each text message is received. In addition, the location information providing unit 560 may provide a location based on location information of a base station in communication with the mobile terminal, reception information of a Global Positioning System (GPS), or information of a wireless internet access point. The path guidance unit 570 may guide a path to a destination that may be specified by a user, based on the determined location information.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the devices described herein may refer to mobile devices such as a cellular phone, a personal digital assistant (PDA), a digital camera, a portable game console, and an MP3 player, a portable/personal multimedia player (PMP), a handheld e-book, a portable tablet and/or laptop PC, a global positioning system (GPS) navigation, and devices such as a desktop PC, a high definition television (HDTV), an optical disc player, a setup box, and the like consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of locating a mobile terminal, the method comprising:
   creating at least one location related candidate for the mobile terminal by analyzing a message that indicates a card usage, wherein the message is received by the mobile terminal; and
   determining a location of the mobile terminal by matching the created location related candidate to stored place information.

2. The method of claim 1, wherein the determining of the location of the mobile terminal is performed by further referring to reception time information at which the message is received to the mobile terminal.

3. The method of claim 1, further comprising correcting information about the determined location, using the determined location of the mobile terminal, based on at least one of:
- location information of a base station in communication with the mobile terminal;
- reception information of a Global Positioning System (GPS); and
- information of a wireless internet access point.

4. The method of claim 1, wherein the creating of the location related candidate comprises extracting a location related word or a place related word from the received message.

5. The method of claim 4, wherein the stored place information comprises exact location information which corresponds to the extracted word, the location information being updated or added according to the determined location of the mobile terminal.

6. The method of claim 1, wherein the message comprises at least one of a short message service (SMS) or a multimedia messaging service (MMS).

7. The method of claim 1, wherein the message comprises at least one of a message regarding credit card processing, a message regarding membership card usage, or a message regarding point card usage.

8. The method of claim 1, wherein the stored place information comprises an abbreviation name or another name which is set by a user and to which exact location data is matched.

9. The method of claim 1, wherein the determined location of the mobile terminal comprises at least one of:
- azimuth information, comprising at least one of: longitude, latitude, or an altitude, or
- place information denoting a place name.

10. The method of claim 1, wherein the determining of the location is performed by extracting place information belonging to a group which is selected by a user from the stored place information, and matching the extracted place information to the location related candidate.

11. The method of claim 1, wherein, if location related information is incapable of being extracted from the message, the creating of the location related candidate is performed by directly receiving a location related candidate from a user.

12. The method of claim 1, further comprising guiding a path to a user-designated destination based on the determined location of the mobile terminal.

13. The method of claim 1, further comprising providing another user with the determined location of the mobile terminal.

14. An apparatus for locating a mobile terminal, the apparatus comprising:
- a location related candidate extracting unit configured to create at least one location related candidate for the mobile terminal by analyzing a message that indicates a card usage, wherein the message is received by the mobile terminal;
- a place information storage unit configured to store place information about a place which is identified by an exact location; and
- a location determination unit configured to determine a location of the mobile terminal by matching the created location related candidate to the stored place information.

15. The apparatus of claim 14, wherein the location determination unit is further configured to determine the location of the mobile terminal by further referring to reception time information at which the message is received to the mobile terminal.

16. The apparatus of claim 14, further comprising:
- a location information providing unit configured to provide the location of the mobile terminal based on at least one of:
- the location information of a base station in communication with the mobile terminal;
- reception information of a Global Positioning System (GPS),
- information of a wireless internet access point; and
- a location information correcting unit configured to correct information about the determined location of the mobile terminal that is provided from the location information providing unit, by use of the determined location of the mobile terminal.

17. The apparatus of claim 14, wherein the place information storage unit is further configured to update or add the stored place information by use of the determined location of the mobile terminal.

18. The apparatus of claim 14, wherein the determined location of the mobile terminal comprises at least one of:
- azimuth information comprising at least one of: longitude, latitude, or altitude, or
- location information denoting a place name.

19. The apparatus of claim 14, further comprising a path guiding unit configured to guide a path to a user-designated destination based on the determined location of the mobile terminal.

20. A non-transitory computer-readable information storage medium storing a program for causing a computer to implement a method of locating a mobile terminal, comprising: creating at least one location related candidate for the mobile terminal by analyzing a message that indicates a card usage, wherein the message is received by the mobile terminal; and determining a location of the mobile terminal by matching the created location related candidate to stored place information.

* * * * *